J. WALTON.

Assignor to DOUBLE POINTED TACK CO.

Bail Ears for Pails.

No. 8,462. Reissued Oct. 22, 1878.

Witnesses:

A. V. Briesen

John C. Tunbridge

Inventor:

J. Walton by his attorney

A. V. Briesen

N. PETERS, PHOTO-LITHOGRAPHER, WASHINGTON, D. C.

UNITED STATES PATENT OFFICE.

JONATHAN WALTON, OF BROOKLYN, NEW YORK, ASSIGNOR TO DOUBLE POINTED TACK COMPANY, OF NEW YORK CITY.

IMPROVEMENT IN BAIL-EARS FOR PAILS.

Specification forming part of Letters Patent No. 77,853, dated May 12, 1868; antedated April 30, 1868; Reissue No. 7,222, dated July 11, 1876; Reissue No. 8,462, dated October 22, 1878; application filed October 9, 1878.

*To all whom it may concern:*

Be it known that I, JONATHAN WALTON, of the city of Brooklyn, in the county of Kings and State of New York, have invented a new and useful Improvement in Bail-Ears for Pails; and I do hereby declare that the following is a full, clear, and exact description thereof, reference being had to the accompanying drawings, forming a part of this specification.

This invention relates to a new and useful improvement in bail-ears for wooden pails; and it consists in constructing the ears of wire bent in proper form, and attaching them to the pail by clinching, as will be hereinafter described.

The present mode of attaching bails to pails is very defective. The wooden pails have simply thin metal plates attached, perforated with holes to receive the ends of the bail, which are bent to enter and hook into them.

Figure 1:
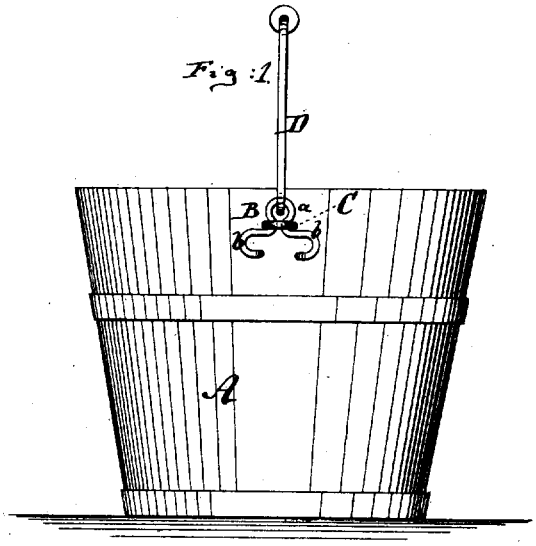
Figure 2:
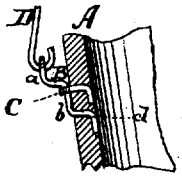

Figure 1 is a side view of a wooden pail having my improvement attached to it; Fig. 2, a vertical section of a portion of a wooden pail having my improvement applied to it.

The pail A is represented of wood, and to it my improved ears B are attached. These ears are of wire, each bent to form an eye or loop, *a*, at its upper part, and a flat body, *b*, at its lower part. Two prongs, *d d*, formed at the ends of each ear, are adapted to pass entirely through the wooden sides of the pail and to be clinched at the inner side. When the ear is thus applied its lower part or body, *b*, bears against the pail, as shown in Fig. 2, while its upper part or eye, *a*, projects at a distance therefrom, as shown, for conveniently receiving the end of the bail D that is passed through said eye and bent into hook form. Staples C, of a size and shape adapted to encompass the ears just below the eyes *a*, further secure them to the pail. These staples are to be clinched at the inner side of the pail.

I claim as my invention—

1. As a new article of manufacture, a bail-ear for pails made of wire, bent to form a loop at the upper part, a flat body at the lower part, and two prongs for securing the bail-ear to the pail, substantially as specified.

2. The combination of the staple with the bail-ear *a b*, substantially as set forth.

Signed by me this 8th day of October, 1878.

JONATHAN WALTON.

Witnesses:
F. v. BRIESEN,
CHAS. B. JESSUP.